Figure 1:
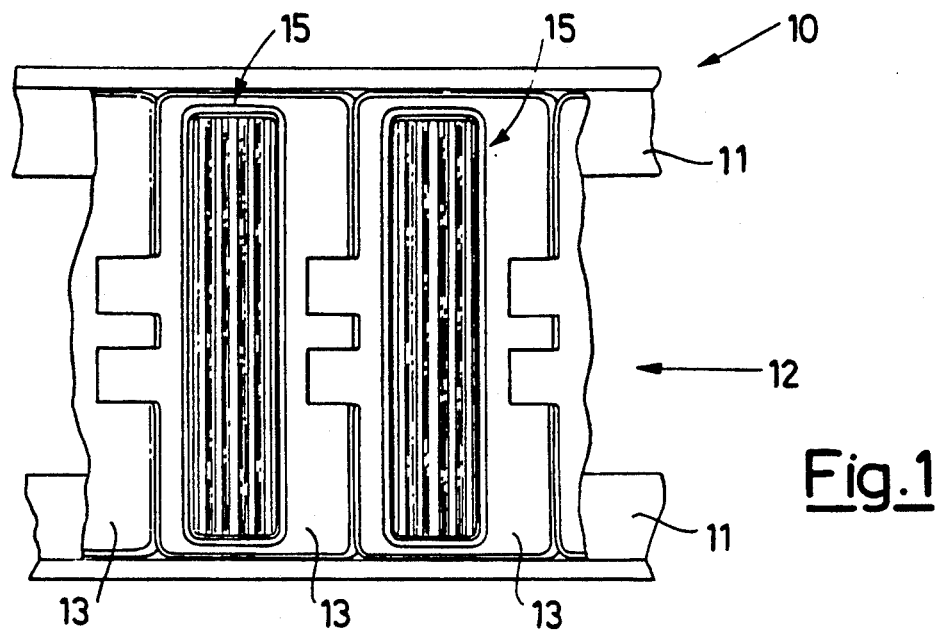

United States Patent [19]
Garbagnati

[11] Patent Number: 5,323,893
[45] Date of Patent: Jun. 28, 1994

[54] REALIZATION METHOD AND CHAIN CONVEYOR WITH COVERING ELEMENTS OF YIELDABLE MATERIAL

[75] Inventor: Carlo Garbagnati, Castello Brianza, Italy

[73] Assignee: Regina Sud S.p.A., Latina, Italy

[21] Appl. No.: 913,429

[22] Filed: Jul. 15, 1992

[30] Foreign Application Priority Data

Jul. 19, 1991 [IT] Italy .................. MI 91 A 002009

[51] Int. Cl.⁵ .............................................. B65G 13/02
[52] U.S. Cl. ............................. 198/690.2; 198/699.1; 198/803.01
[58] Field of Search ................ 198/699.1, 690.2, 688.1, 198/803.01

[56] References Cited

U.S. PATENT DOCUMENTS

| | | | |
|---|---|---|---|
| 2,954,113 | 9/1960 | Hibbard et al. | 198/803.01 |
| 3,952,860 | 4/1976 | Specht | 198/803.01 |
| 4,351,429 | 9/1982 | Garvey | 198/690.2 |
| 4,611,710 | 9/1986 | Mitsufuji | 198/803.01 |

FOREIGN PATENT DOCUMENTS 0175483 3/1986 European Pat. Off. .
931359 7/1963 United Kingdom .

*Primary Examiner*—Cheryl L. Gastineau
*Attorney, Agent, or Firm*—Stevens, Davis, Miller & Mosher

[57] ABSTRACT

A continuous conveyor (10) comprises first rigid link elements (13) interconnected to run in guides (11) and with application above a plurality of second elements (15) of yielding material at least on top. One method of realization of the conveyor comprises the phases of molding of compatible material for stable connection with the material of the links, frames (16) with seats with undercuts (19) at least on top, molding on each frame (16) of a part made of yielding material (17) which fills the seats and projects above from the frame, and fixing the frames (16) in respective positions on the link elements for direct connection of frame zones to the link elements. The connection is advantageously achieved by ultrasonic welding.

7 Claims, 1 Drawing Sheet

REALIZATION METHOD AND CHAIN CONVEYOR WITH COVERING ELEMENTS OF YIELDABLE MATERIAL

In the realization of chain conveyors the need to apply in some cases rubber pads or the like on top of the elements or links of the conveyor to provide for example an antislip function is known.

It being necessary to provide a mechanical coupling with high strength between the elements of the conveyor and the pads in the known art there have been proposed various fixing techniques.

For example, a simple fixing technique calls for the use of bolts passing between a link element and its respective pad. Said technique is however only applicable for very thick pads because the bolt head must not project above the pad. In addition the time and cost of bolting individually all the pads on a conveyor are both high. Another known technique calls for the execution of undercut hollow parts made in the link elements so as to mold or engage by forcing the pads therein. Such a fixing however requires special processing of the link elements which prevents its use without application of the pads. It is thus obligatory to have a version of conveyor link without rubber pads and a link version with cavities for engagement or molding of the pads, with the obvious production costs, complication and storage.

To obviate the problem there has also been proposed direct glueing of the pads of yieldable material on the link elements of the type provided for use without them so as to limit to a single version the link elements. Said solution has however been discarded because it does not provide sufficient assurance of mechanical strength, the yieldable materials such as rubber used in the pads not being compatible for glueing with the materials such as thermo-plastic resins used often for the realization of the link elements.

The general purpose of the present invention is to obviate the above mentioned shortcomings by supplying a construction method for link conveyors with top yieldable pads which ensure the highest mechanical reliability without special processing of the link elements with in addition considerable simplicity and speed of construction. Another purpose of the invention is to provide a conveyor as described above and embodied in accordance with said method.

In view of said purpose it has been sought to provide in accordance with the present invention a method of manufacturing a continuous conveyor with first rigid link elements interconnected with the application above of a plurality of second elements of yieldable material at least above and characterized by the molding of compatible material for stable connection with the material of the link frames with undercut seats at least on top, molding on each frame a part in yieldable material filling said seats and projecting above from the frame, and fixing the frames in their respective positions on the link elements for direct connection of zones of frames to the link elements.

In addition it has been sought to provide a continuous conveyor with first rigid link elements interconnected with the application above of a plurality of second elements of yieldable material at least on top and characterized in that said second elements comprise a frame of material compatible with the purpose of stable connection with the material of the links, the frame having at least on top undercut seats and on these there being molded a part in yieldable material filling said seats and projecting from the frame at the top, the frames being fixed below to link elements for direct connection of their zones to the link elements.

Figure 2:
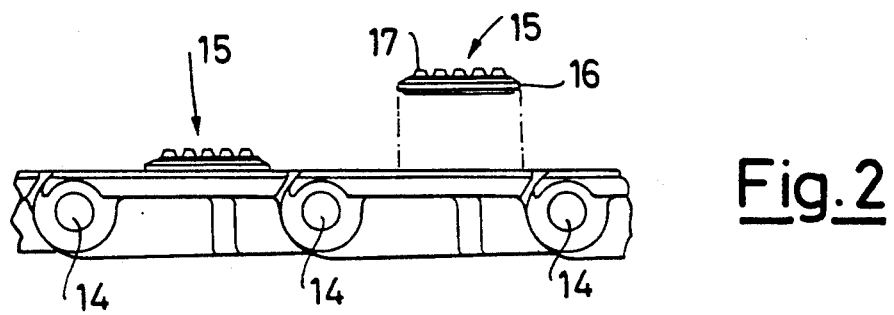
Figure 3:
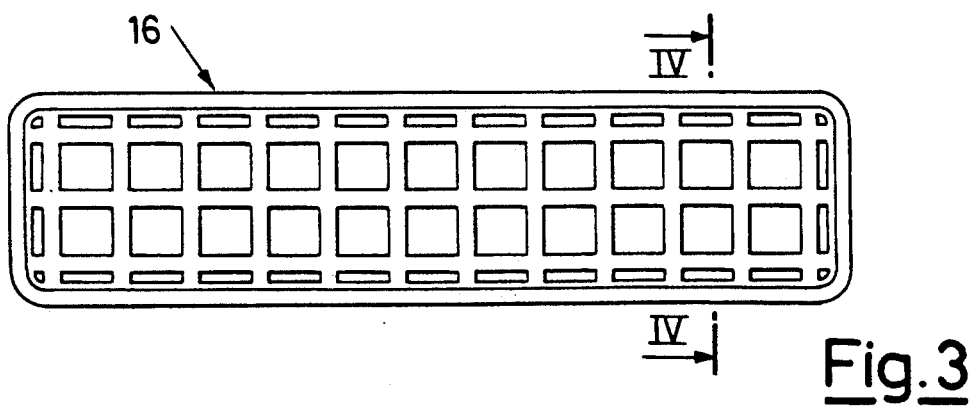
Figure 4:
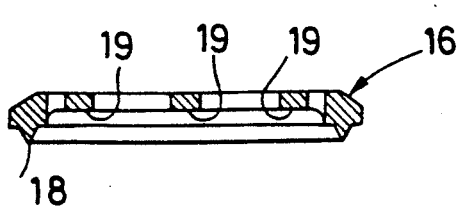
Figure 5:
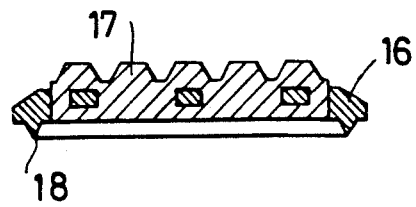

To further clarify the explanation of the innovative principles of the present invention and its advantages as compared with the known art there is described below with the aid of the annexed drawings a possible embodiment as a nonlimiting example applying said principles. In the drawings:

FIG. 1 shows a schematic partial plan view of a conveyor in accordance with the present invention, FIG. 2 shows a partially exploded partial side view of the conveyor of FIG. 1, FIG. 3 shows a plan view of a frame element used in the conveyor of FIG. 1, FIG. 4 shows a cross section view along plane of cut IV—IV of FIG. 3, and FIG. 5 shows a view similar to that of FIG. 4 but with the frame partially embedded in yieldable material.

With reference to the figures as may be well seen in FIGS. 1 and 2 a conveyor 10 comprises link elements 13 hinged together at 14 in sequence to form a chain 12 running along guides 11 to provide an upper conveyance surface. On the links 13 are fixed on top elements 15 of yieldable material, e.g. rubber, to constitute a supporting surface for the objects conveyed.

Up to this point there is described the substantially known art and for this reason the exact form of the links 13 and additional elements such as linkages, moving motors for the chain and other parts easily imaginable by those skilled in the art are not further shown nor described in detail.

In accordance with the innovative method of realization claimed herein the elements 15 are made by forming initially a frame 16 (shown in FIG. 3) using a material compatible with the material used for realization of the links 13. By mutually compatible materials is meant materials which allow mutual stable connection, e.g. by glueing or by hot or ultrasonic welding, etc. Heatmolded plastics can be used advantageously.

The frame 16 is formed with a structure having undercut seats 19, e.g. in the form of a reticulate structure. As may be seen in FIG. 4, the frame has a peripheral edge with ribbing 18 designed to be placed in contact with the corresponding link to be firmly fixed thereto. For example, the ribbing is advantageously shaped substantially with a triangular cross section to have a lower edge with a small contact surface with the link so as to facilitate subsequent ultrasonic welding together thereof in accordance with the known art.

Once the frame 16 is completed, there is molded thereon a part 17 of yieldable material, e.g. rubber, so as to anchor it in the undercut seats.

For the simplified realization shown, this consists of embedding in the yieldable material the reticulate parts of the frame, as shown in FIG. 5.

On the top, the part in yieldable material is shaped with ribbings projecting from the frame to constitute the desired support surface. For example, there can be provided low ribbings as shown or higher ribbings in finger form or yieldable edges as known in the art. After the assemblies 15 are obtained they can be rapidly and stably fixed to the links as mentioned above. Naturally the above description of an embodiment applying the innovative principles of the present invention is given merely by way of example and therefore is not to be taken as a limitation of the patent right claimed here.

For example, the form of the frame as that of the links can be different depending on the specific requirements. In particular the conveyor can be also the type with several interconnected links aligned transversely to the direction of travel. In addition, the upper yieldable surface can be different.

Finally, the contact zones between the frames and links can be different from those shown depending on the type of fixing selected. For example, in case of glueing, there can be provided a relatively ample contact zone or in the case of hot welding, e.g. spot welding, there can be provided zones or tongues of frame projecting laterally to be easily welded to the link surfaces.

I claim:

1. Method for the formation of a continuous conveyor with first interconnecting rigid link elements by application of a plurality of second elements of yieldable material at least on top of said first rigid link elements and compatible therewith comprising
   molding frames from material compatible with said first rigid link elements, each said frame having at least top seats with undercuts,
   molding on each frame a part made of yieldable material which fills said seats and projects above said frame, and
   fixing the frames in respective positions on said first rigid link elements.

2. The method in accordance with claim 1 wherein the frames are fixed to said rigid link elements by welding.

3. The method in accordance with claim 2 wherein the welding is achieved by ultrasonic emission.

4. Continuous conveyor with first interconnected rigid link elements having a plurality of second elements of yieldable material at least on top of said first rigid link elements, each of said second elements comprising a frame of material compatible for the purpose of stable connection with the material of one of said first rigid link elements, each said frame having at least on top undercut seats and on each frame a molded part of yieldable material filling said seats and projecting from the frame at the top, said frames being fixed below to said first rigid link elements.

5. The conveyor in accordance with claim 4 wherein said seats consist of openings passing through each said frame and each said frame has the form of an open reticulate structure.

6. The conveyor in accordance with claim 4 wherein each said frame has ribbing below designed to be placed in contact with one of said first rigid link elements and welded ultrasonically.

7. The conveyor in accordance with claim 6 wherein said ribbing is made in the form of a peripheral edge projecting at the bottom of each said frame.

* * * * *